(12) United States Patent
Wright

(10) Patent No.: US 7,265,573 B1
(45) Date of Patent: Sep. 4, 2007

(54) METHODS AND STRUCTURES FOR PROTECTING PROGRAMMING DATA FOR A PROGRAMMABLE LOGIC DEVICE

(75) Inventor: Adam Wright, Saratoga, CA (US)

(73) Assignee: Altera Corporation, San Jose, CA (US)

( * ) Notice: Subject to any disclaimer, the term of this patent is extended or adjusted under 35 U.S.C. 154(b) by 447 days.

(21) Appl. No.: 11/015,568

(22) Filed: Dec. 18, 2004

(51) Int. Cl.
*H03K 19/00* (2006.01)
*G06F 11/30* (2006.01)

(52) U.S. Cl. .............................. 326/8; 326/10; 326/38; 326/39; 713/193; 713/187

(58) Field of Classification Search ................... 326/8, 326/10, 38, 39; 713/189, 193
See application file for complete search history.

(56) References Cited

U.S. PATENT DOCUMENTS

| | | |
|---|---|---|
| 4,899,067 A | 2/1990 | So et al. |
| 5,260,611 A | 11/1993 | Cliff et al. |
| 5,369,314 A | 11/1994 | Patel et al. |
| 5,434,514 A | 7/1995 | Cliff et al. |
| 5,592,102 A | 1/1997 | Lane et al. |
| 5,777,887 A | 7/1998 | Marple et al. |
| 5,915,017 A * | 6/1999 | Sung et al. .................. 713/187 |
| 5,926,036 A | 7/1999 | Cliff et al. |
| 6,034,536 A | 3/2000 | McClintock et al. |
| 6,049,876 A * | 4/2000 | Moughanni et al. .......... 726/26 |
| 6,107,820 A | 8/2000 | Jefferson et al. |
| 6,167,558 A | 12/2000 | Trimberger |
| 6,201,404 B1 | 3/2001 | Reddy et al. |
| 6,337,578 B2 | 1/2002 | Jefferson et al. |
| 6,344,755 B1 | 2/2002 | Reddy et al. |
| 6,404,226 B1 | 6/2002 | Schadt |
| 6,545,501 B1 | 4/2003 | Bailis et al. |

(Continued)

OTHER PUBLICATIONS

U.S. Appl. No. 10/856,434, Chan et al.
Betz, Vaughn and Jonathan Rose, Alexander Marquardt, eds. (Mar. 1999) *Architecture and CAD for Deep-Submicron FPGAs*. Kluwer Academic Publishers: Norwell, MA: Chapter 2.1 (pp. 11-18), Chapter 4 (pp. 63-103), Chapter 5 (pp. 105-126), and Chapter 7 (pp. 151-190).

(Continued)

*Primary Examiner*—Vibol Tan
(74) *Attorney, Agent, or Firm*—Townsend and Townsend and Crew LLP

(57) ABSTRACT

Methods and structures for protecting programmable logic device ("PLD") programming files are disclosed. In one respect, an embodiment of the present invention includes applying a particular protective setting to a PLD, the setting has a relationship to proper programming of the PLD. A configuration program generates programming data including a non-pre-processed and a pre-processed portion. The pre-processed data reflects the results of processing that is carried out off-device (e.g. by the configuration program on a user computer), but is consistent with the logic of certain on-device processing circuitry. The pre-processing also takes into account information regarding the particular applied setting. The non-pre-processed portion of the programming data is further processed by the certain on-device processing circuitry. The output of the on-device processing circuitry is combined with the pre-processed portion of the programming data in a bit stream for programming the PLD. In another respect, some embodiments utilize a PLD redundancy scheme for implementing programming data protection.

25 Claims, 11 Drawing Sheets

U.S. PATENT DOCUMENTS

| | | |
|---|---|---|
| 6,600,337 B2 | 7/2003 | Nguyen et al. |
| 6,605,962 B2 | 8/2003 | Lee et al. |
| 6,630,842 B1 | 10/2003 | Lewis et al. |
| 6,653,862 B2 | 11/2003 | Johnson et al. |
| 6,819,133 B1* | 11/2004 | Kliesner et al. ............... 326/8 |
| 6,826,741 B1 | 11/2004 | Johnson et al. |
| 7,107,567 B1* | 9/2006 | LeBlanc ...................... 716/17 |
| 2001/0015919 A1* | 8/2001 | Kean ......................... 365/200 |
| 2002/0166106 A1 | 11/2002 | Lewis et al. |
| 2002/0168067 A1* | 11/2002 | Kouzminov ................ 380/201 |
| 2003/0072185 A1 | 4/2003 | Lane et al. |
| 2004/0034789 A1* | 2/2004 | Horvat et al. ............... 713/193 |
| 2005/0010804 A1* | 1/2005 | Bruening et al. ........... 713/200 |

OTHER PUBLICATIONS

Hatori, F. et al. (1993) "Introducing Redundancy in Field Programmable Gate Arrays," IEEE Custom Integrated Circuits Conference, pp. 7.1.1-7.1.4, month unknown.

* cited by examiner

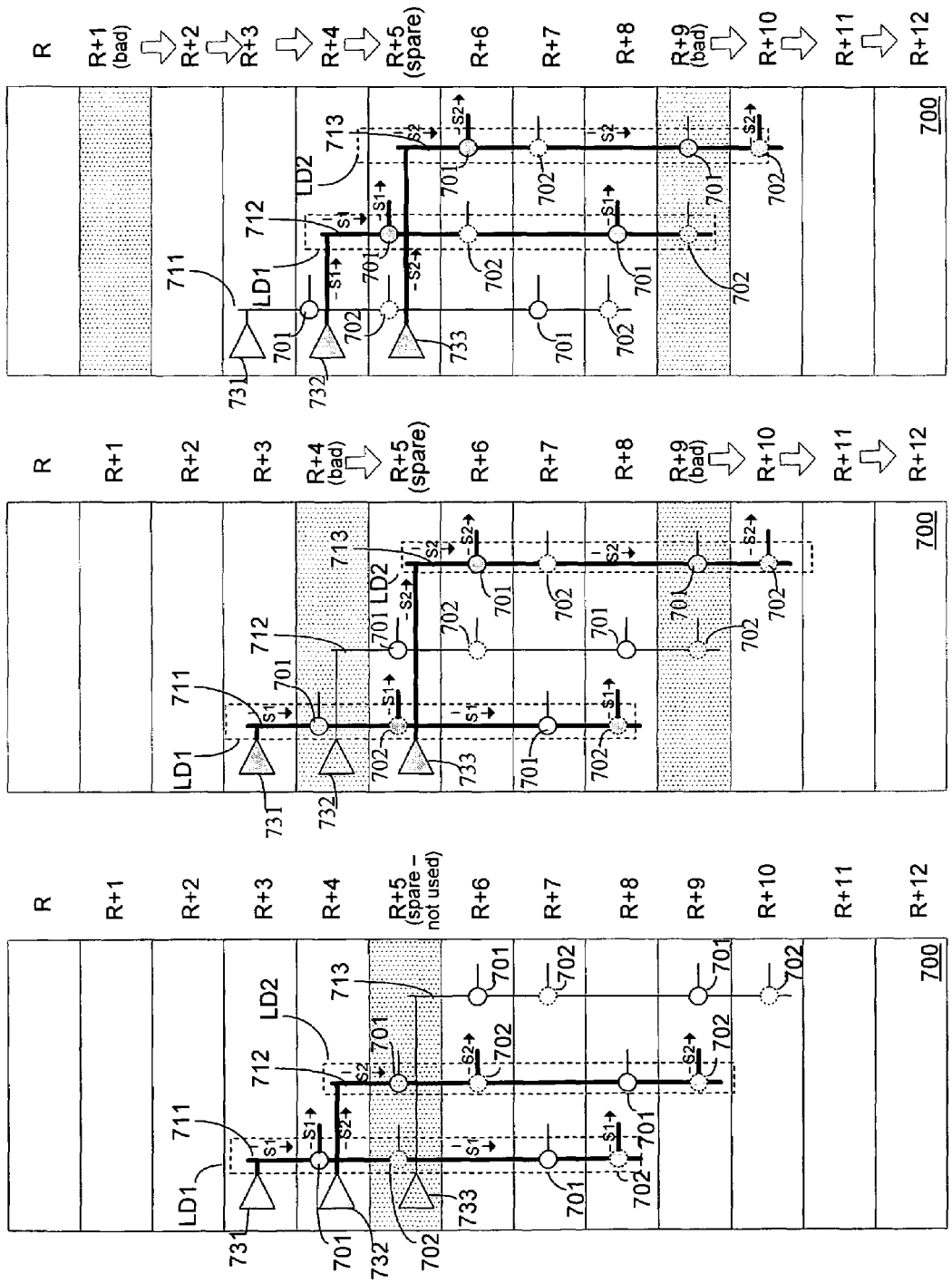

METHODS AND STRUCTURES FOR PROTECTING PROGRAMMING DATA FOR A PROGRAMMABLE LOGIC DEVICE

BACKGROUND OF THE INVENTION

1. Field of the Invention

The present invention relates to protecting programmable logic device programming files 2. Description of Related Art Programmable logic devices ("PLDs") (also sometimes referred to as CPLDs, PALs, PLAs, FPLAs, EPLDs, EEPLDs, LCAs, FPGAs, or by other names), are well known integrated circuits that provide the advantages of fixed integrated circuits with the flexibility of custom integrated circuits. Such devices are well known in the art and typically provide an "off the shelf" device having at least a portion that can be programmed to meet a user's specific needs. Application specific integrated circuits ("ASICs") have traditionally been fixed integrated circuits, however, it is possible to provide an ASIC that has a portion or portions that are programmable; thus, it is possible for an integrated circuit device to have qualities of both an ASIC and a PLD. The term PLD as used herein will be considered broad enough to include such devices.

PLDs typically include blocks of logic elements, sometimes referred to as logic array blocks ("LABs"; also referred to by other names, e.g., "configurable logic blocks," or "CLBs"). Logic elements ("LEs", also referred to by other names, e.g., "logic cells") may include a look-up table (LUT) or product term, carry-out chain, register, and other elements. LABs (comprising multiple LEs) may be connected to horizontal and vertical lines that may or may not extend the length of the PLD.

PLDs have configuration elements that may be programmed or reprogrammed. Configuration elements may be realized as RAM bits, flip-flops, EEPROM cells, or other memory elements. Placing new data into the configuration elements programs or reprograms the PLD's logic functions and associated routing pathways. Configuration elements that are field programmable are often implemented as RAM cells (sometimes referred to as "CRAM" or "configuration RAM"). However, many types of configurable elements may be used including static or dynamic random access memory, electrically erasable read-only memory, flash, fuse, and anti-fuse programmable connections. The programming of configuration elements could also be implemented through mask programming during fabrication of the device. While mask programming may have disadvantages relative to some of the field programmable options already listed, it may be useful in certain high volume applications. For purposes herein, the generic term "configuration element" will be used to refer to any programmable element that may be configured to determine functions implemented by or routing between other PLD elements.

PLDs having redundant circuitry can help improve production yields by providing regions on the device that can be repaired by engaging the redundant circuitry. A row based redundancy scheme typically provides at least one redundant or "spare" row in an array of logic circuitry (e.g. an array of LABs and associated routing). Row based redundancy schemes are described, for example, in commonly assigned U.S. Pat. Nos. 6,201,404 (entitled "Programmable Logic Device with Redundant Circuitry") and 6,344,755 (entitled "Programmable Logic Device with Redundant Circuitry") and are further described in commonly assigned pending U.S. patent application Ser. Nos. 10/159,581 (entitled "Programmable Logic Device with Redundant Circuitry") and 10/856,434 ("Redundancy Structures and Methods in a Programmable Logic Device"). Typically, a repairable region may be defined above the spare row such that, if one of the rows of the logic array is defective, the spare row is activated and each row from the spare row to the bad row replaces the next higher row, thus repairing the defective region.

A PLD provider typically sells PLDs to a PLD customer and also provides that customer with a configuration program for programming the PLDs. The PLD customer then uses the configuration program to generate a programming data file that implements a particular device design when loaded onto the PLD. There is a risk to the PLD customer, however, that a competitor may improperly take the data file and purchase the same PLDs off the shelf from the PLD provider in order to misappropriate and implement the PLD customer's design.

It is possible to use known key-based encryption methods to secure a programming file. In such methods, an unlicensed competitor is prevented from decrypting the file to properly program a PLD if that competitor lacks the correct key. However, such methods have the disadvantage of requiring somewhat cumbersome decryption circuitry, thus imposing an undesirably high cost in terms of space used on the PLD. Thus, more efficient methods and structures are needed for protecting a PLD customer's PLD programming data.

SUMMARY OF THE INVENTION

Some embodiments of the present invention include applying a setting to a PLD, the setting is used for protection purposes and has a relationship to proper programming of the PLD. A configuration program generates programming data including a non-pre-processed and a pre-processed portion. The pre-processed data reflects the results of processing that is carried out off-device (e.g. by the configuration program on a user computer), but is consistent with the logic of certain on-device processing circuitry. The pre-processing also takes into account information regarding the particular applied setting. The non-pre-processed portion of the programming data is further processed by the certain on-device processing circuitry. The output of the on-device processing circuitry is combined with the pre-processed portion of the programming data in a bit stream for programming the PLD.

Some embodiments of the present invention leverage a redundancy scheme to implement protection of PLD programming files. In particular, a protective setting may include forced designation of a row as "bad," thus triggering certain aspects of the corresponding redundancy scheme. The applied "bad" row setting affects the proper determination of configuration values for certain rows or row portions on the PLD. The PLD configuration program pre-processes the data for at least some of these affected rows in light of the applied redundancy setting so that the configuration values for certain rows are determined off-device. The portion of the data that is not pre-processed comprises encoded information used in determining the configuration values of other rows on the device. This non-pre-processed data is processed on the device by certain redundancy processing circuitry that decodes the data in light of other redundancy settings to derive the configuration values. In a more particular aspect of some embodiments, the applied redundancy setting and any other necessary redundancy settings are applied via fuse programming.

BRIEF DESCRIPTION OF THE DRAWINGS

The novel features of the invention are set forth in the appended claims. However, for purpose of explanation, several aspects of particular embodiments of the invention are described by reference to the following figures.

FIGS. 6a-6c, 7a-7c, and 8a-8c illustrate vertical routing structures and connections for selected rows of exemplary PLDs in the context of an exemplary redundancy scheme that may be leveraged to implement a particular embodiment of the present invention.

DETAILED DESCRIPTION OF THE EXEMPLARY EMBODIMENTS

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
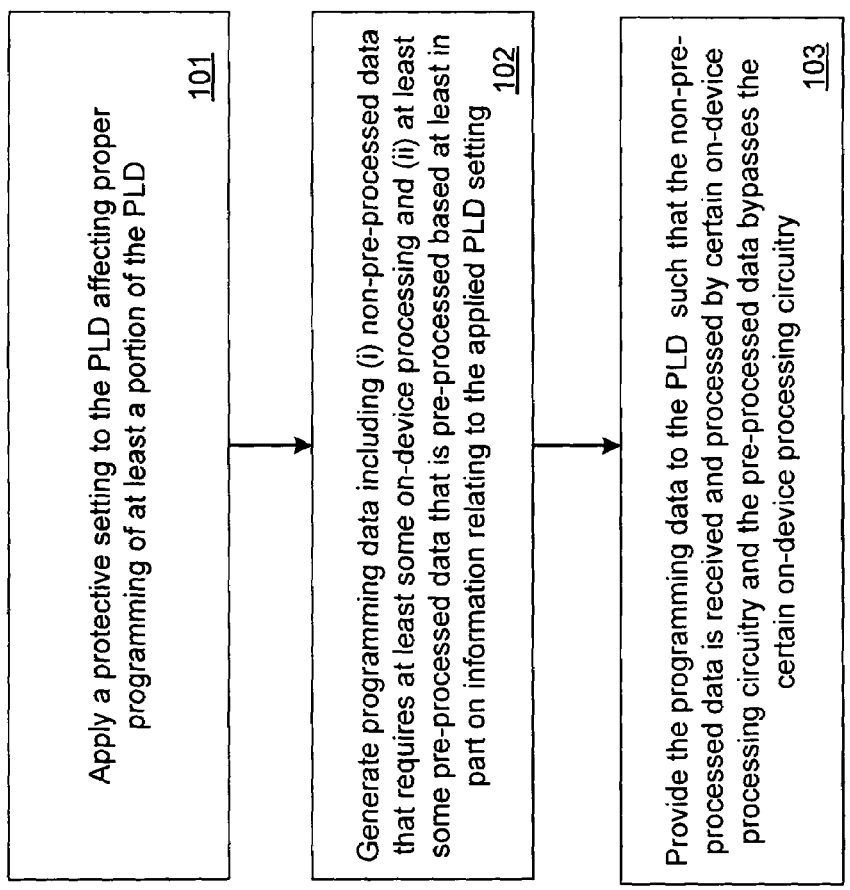
FIG. 1 illustrates an exemplary process 100 consistent with an embodiment of the present invention.

FIG. 1 illustrates an exemplary process 100 consistent with an embodiment of the present invention. Process 100 includes steps illustrated by blocks 101, 102, and 103. At block 101, a protective setting is applied to the PLD. "Protective" as used herein simply means that the setting is applied for protective purposes in the context of an embodiment implementing the protective scheme disclosed herein. "Protective" does not imply particular characteristics of the setting other than its purpose, which is to protect a PLD customer's programming file from being used on PLDs lacking the protective setting. The protective device setting in this example relates to proper programming of at least a portion of the PLD.

In more particular aspects of possible implementations discussed further below (see, e.g. aspects of FIG. 4 and FIGS. 6a-10 and accompanying text), this device setting may relate to a redundancy scheme of the PLD. As one example, the protective setting may designate one or more rows to be "designated bad" rows, thus triggering row shifting and possible other adjustment in accordance with the relevant redundancy scheme. A "designated bad row" simply means a row that is selected to be bypassed under the redundancy scheme and implies nothing about whether or not the particular row is defective.

Continuing with FIG. 1, at block 102, programming data is generated that includes both non-pre-processed and pre-processed programming data. "Pre-processed" and "non-pre-processed" in this context simply refer to whether or not logic consistent with certain on-device processing circuitry has yet been applied to the data. In particular, obtaining configuration data to properly configure the PLD in this example depends upon certain processing logic that processes encoded programming data to arrive at the correct configuration bit values to load into the PLD's configuration elements. Furthermore, in the present exemplary method, some of the data is processed by certain processing circuitry on the PLD ("on-device" processing circuitry), and some of the programming data is processed consistent with logic of the certain on-device processing circuitry in light of an applied device setting (the protective setting) before being loaded onto the PLD. The data that is to be processed by the on-device processing circuitry is sometimes referred to herein as "non-pre-processed" data. In other words, the relevant processing logic is not applied to the data until after it is loaded onto the PLD. The data that is processed consistent with logic of the certain on-device processing circuitry before being loaded onto the PLD is sometimes referred to herein as "pre-processed" data.

At block 103, the programming data, including both non-pre-processed and pre-processed portions, is provided to the PLD. The non-pre-processed portion is processed on the PLD by the on-device processing circuitry. The pre-processed data is provided in a manner that selectively bypasses the on-device processing circuitry. In this manner, output of the on-device processing circuitry may then be combined with the pre-processed data to provide processed data for configuring the PLD.

Figure 2:
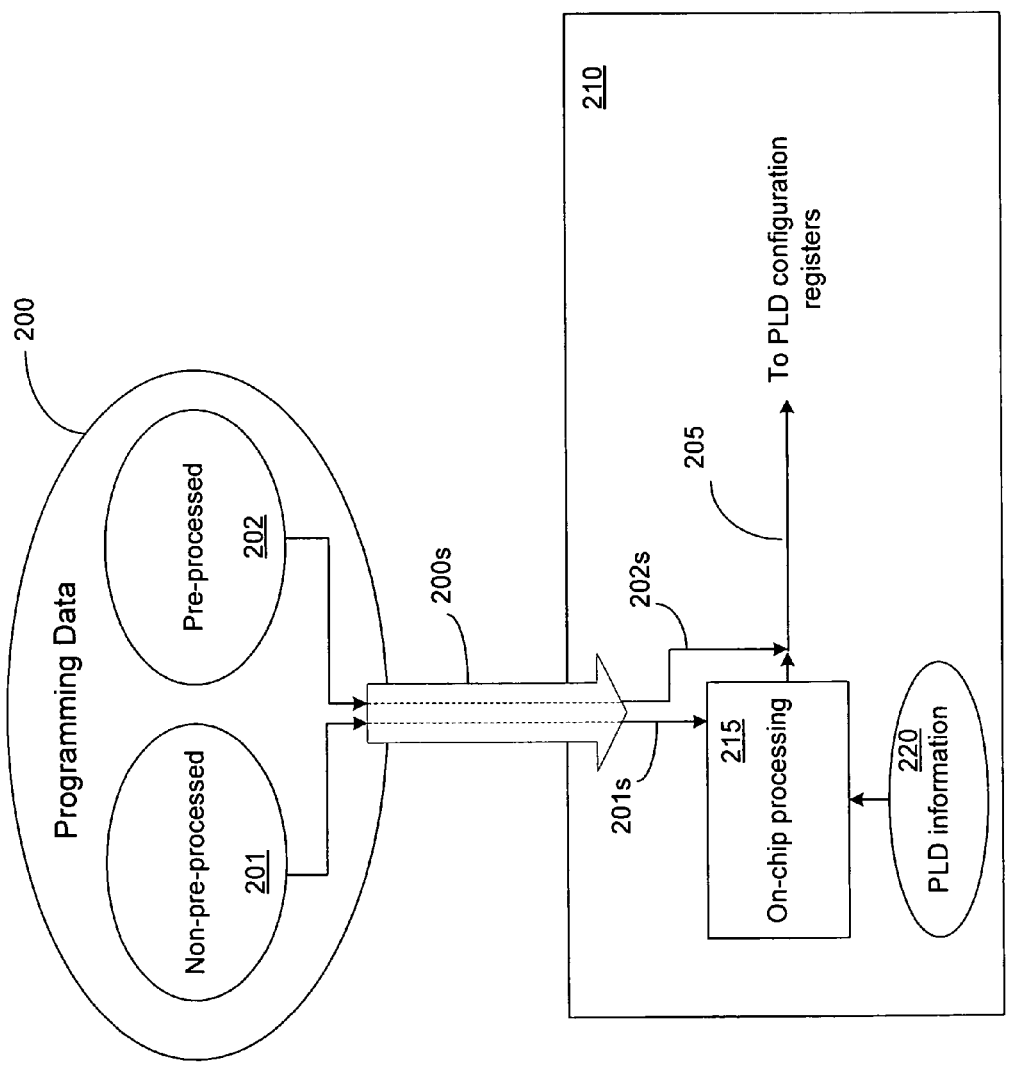
FIG. 2 illustrates the implementation of process 100 in a particular example.

FIG. 2 illustrates the implementation of process 100 of FIG. 1 in a particular example. As illustrated, programming data 200 includes non-pre-processed portion 201 and pre-processed portion 202. The data 200 can be provided in a stream 200s to PLD 210. Non-pre-processed stream portion 201s is processed by on-device processing circuitry 215 based in part on PLD setting information 220. Pre-processed stream portion 202s has been pre-processed off-chip consistent with certain logic of on-chip processing 215 and in light of certain information regarding the on-device settings including the applied protective setting. Thus, stream portion 202s does not require processing by on-device processing circuitry 215. Therefore stream portion 202s can be combined with output from on-device processing circuitry 215 form configuration bit stream 205. Configuration bit stream 205 includes actual bit values to be loaded into PLD 210's configuration registers and then subsequently loaded into appropriate configuration elements to configure the PLD.

Figure 3:
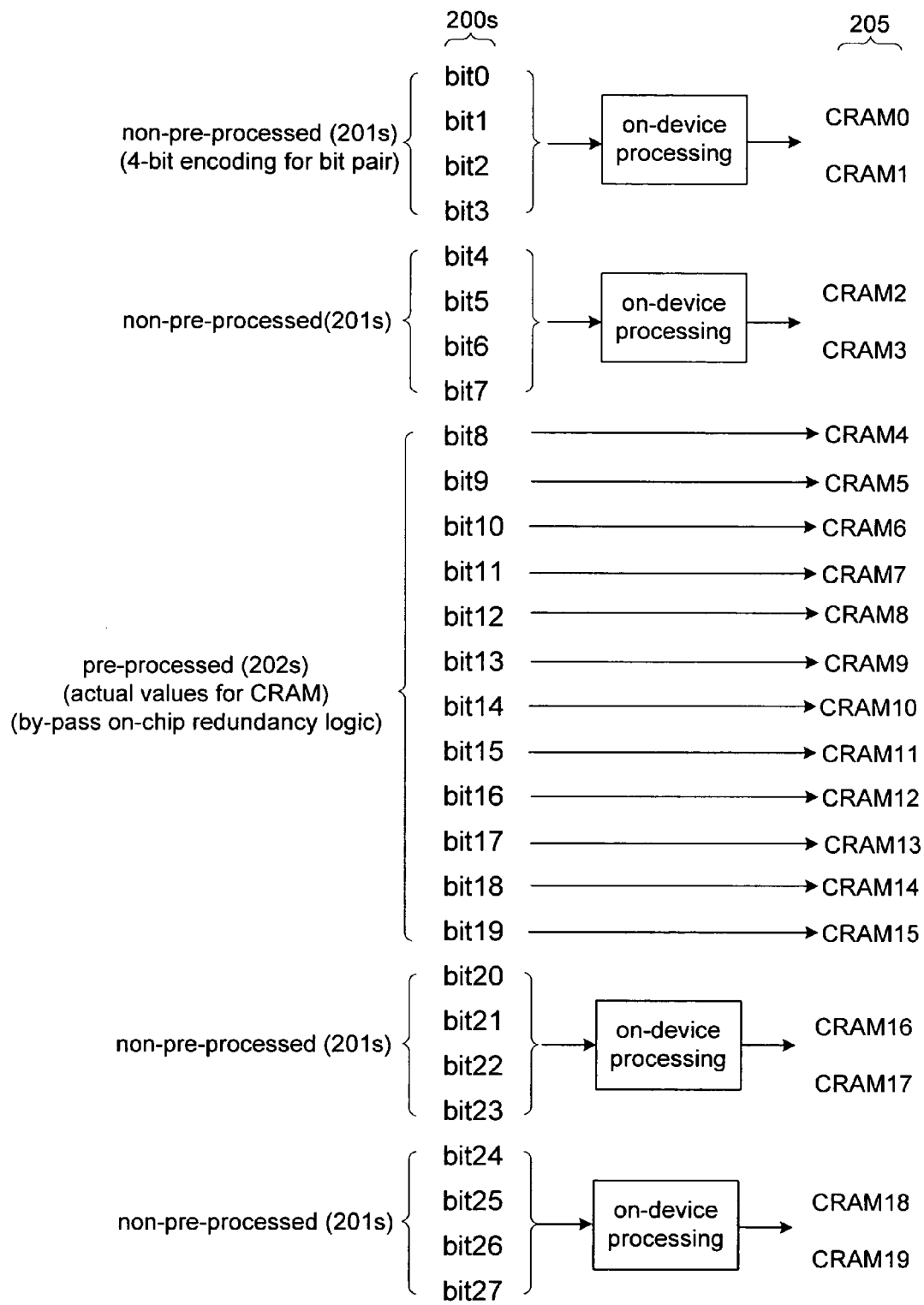
FIG. 3 illustrates the relationship between sample portions of programming data stream 200s and configuration bit stream 205 of FIG. 2.
Figure 9:
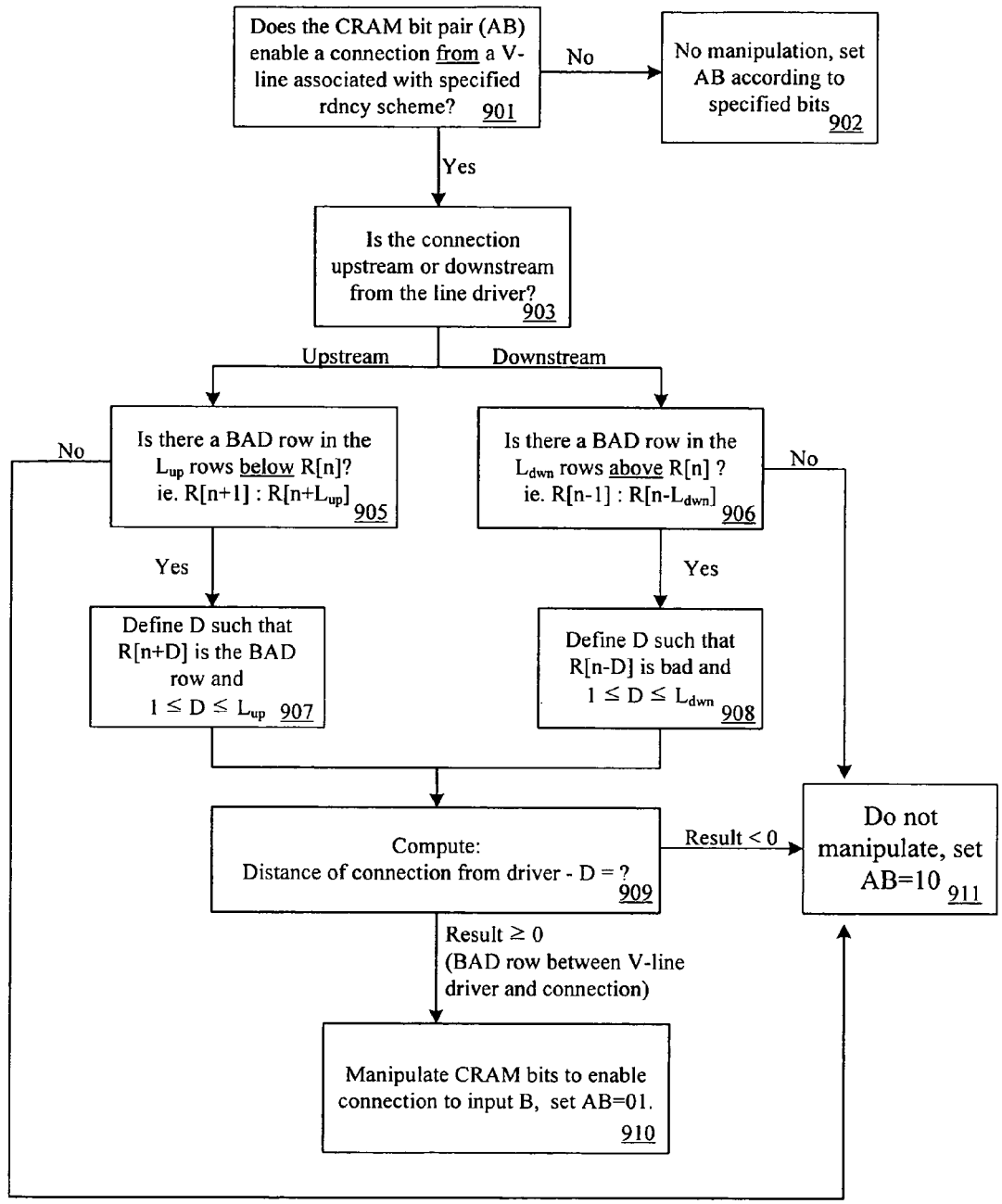
FIG. 9 is a flow diagram illustrating a process 900 for implementing a bit flipping decision with respect to pairs of configuration bits. Process 900 is an example of processing logic that can be implemented by redundancy processing circuitry 412 and configuration program 455 of FIG. 4 in a PLD with the redundancy scheme illustrated in FIGS. 6a-8c.

FIG. 3 illustrates the relationship between the content of programming data stream 200s and that of configuration bit stream 205. FIG. 3 shows a simplified and exemplary portion of these streams for illustrative purposes. The data stream illustration of FIG. 3 assumes that the relevant on-device processing and applied device settings including the protective setting relate to a redundancy scheme of the PLD. The illustration further assumes that the content of the non-pre-processed data stream portion 201s represents a 4-bit encoding of configuration bit pairs, an example of which is discussed later in the context of FIG. 9. The illustration further assumes that the processing logic illustrated and described in the context of FIG. 9 is applied by on-device processing circuitry in order to decode two configuration bit values from each corresponding 4-bits of non-pre-processed programming data.

With this context in mind, FIG. 3 shows a portion of programming data stream 200s including twenty-eight exemplary data bits, labeled bit0-bit27, and a portion of a corresponding configuration bit stream including twenty bits, labeled CRAM0-CRAM19 ("CRAM" stands for "configuration RAM" and simply is a label reflective of the fact that a particular example may implement configuration elements as random access memory cells). The programming data stream 200s includes non-pre-processed portion 201s, comprising bit0-bit7 and bit20-bit27, and pre-processed portion 202s comprising bit8-bit19. The non-pre-processed portion 201s represents four groups of 4-bits each including bit0-bit3, bit4-bit7, bit20-bit23, and bit24-bit27. Each group encodes a pair of configuration bit values. The on-device processing applies logic related to the PLD's redundancy scheme to a group of four data bit values to decode two configuration values for loading into configuration elements. For example, bit0, bit1, bit2, and bit3 are decoded by the relevant on-device circuitry to determine to configuration element values, CRAM0 and CRAM1.

In contrast to the non-pre-processed portion 201s, the pre-processed portion 202s includes bit values that do not require processing by same on-device processing circuitry that decodes non-pre-processed portion 201s. Rather, pre-processed portion 202s already contains the correct configuration bit values. Thus, for this portion of the data stream, the programming data and the configuration data are the same. In particular, bit8-bit19 are the configuration element values CRAM4-CRAM15 that will be loaded into configuration elements of the PLD. Bit8-bit19 represent the result of off-chip processing that has applied logic to encoded data in light of the relevant on-device settings to generate a bit stream that contains the values for CRAM4-CRAM15. Thus configuration stream 205 represents the combination of data that is the result of certain on-device processing (i.e. CRAM0-CRAM3 and CRAM16-CRAM-CRAM19) and data that is the result of similar processing logic already applied off-chip (i.e. CRAM4-CRAM15, which are equivalent to bit8-bit19).

Figure 4:
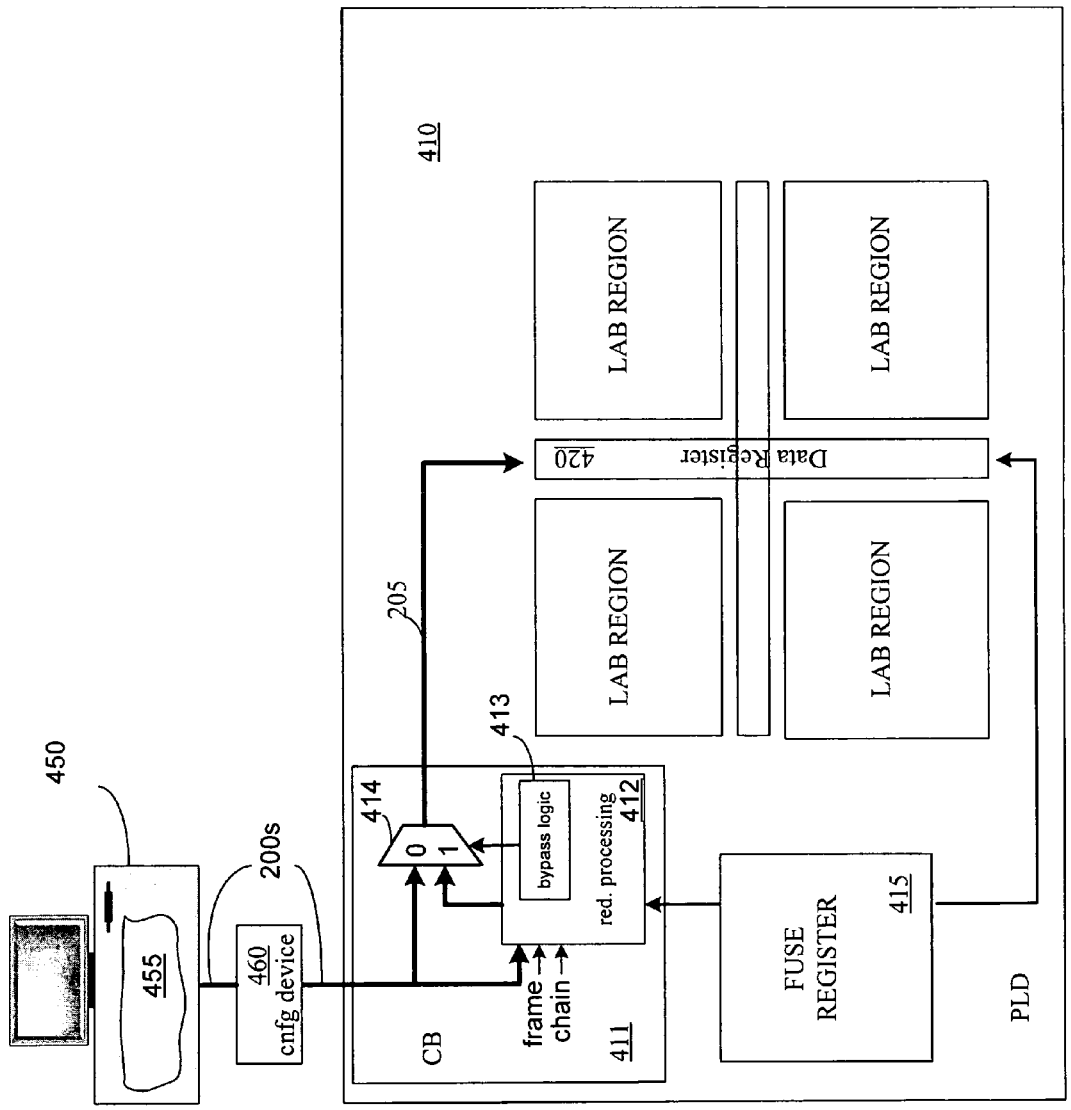
FIG. 4 illustrates a more detailed example of hardware and software in which an embodiment of the present invention might be implemented using the exemplary programming data stream 200s referenced in FIGS. 2-3.

FIG. 4 illustrates a more detailed example of hardware and software in which an embodiment of the present invention might be implemented using the exemplary programming data stream 200s referenced in FIGS. 2-3. A PLD user computer 450 is capable of running PLD design program 455. Program 455 is used to generate programming data to implement a user design in PLD 410. The programming data is provided as programming data stream 200s to configuration device 460 and then to PLD 410.

Programming data stream 200s is provided to control block ("CB") 411. More specifically, data stream 200s is provided to both redundancy processing circuitry 412 and to input0 of multiplexer ("mux") 414. The output of redundancy processing logic circuitry 412 is provided to input1 of mux 414. Redundancy processing circuitry 412 applies processing logic to the non-pre-processed portion of programming data stream 201 based in part on redundancy device settings stored in fuse register 415. CB 411 uses "frame" and "chain" information to track which programming data presently being streamed relates to which configuration elements in PLD 410's matrix of configuration elements (configuration matrix not separately shown). "Frame" and "chain" are simply labels that refer to, respectively, the horizontal and vertical position of a particular configuration element relevant to other configuration elements programmed by configuration bit values in stream 205. Frame and chain values corresponding to incoming data in conjunction with information from fuse register 415 can be used to identify the position of a bad row (or "designated" bad row) relative to a particular connection to be programmed.

In the present example, the pre-processed portion of data 200 is used for programming rows or row portions whose programming is affected by the forced designation of a bad row within the context of a redundancy scheme of PLD 410. In other words, a redundancy device setting applied by programming fuse register 415 to indicate a particular "designated bad row" for purposes of protecting the programming data file (as oppose to a bad row designation applied for the purpose of repairing a row that is actually defective) will affect the proper programming of certain logic rows or logic row portions in the PLD's LAB regions. (Note, as used herein, the term "row" by itself will be considered broad enough to include row portions as well as entire rows). In a particular example, the affected rows are programmed by pre-processed data. However, it is not necessary that all such affected rows be programmed by pre-processed data. An implementation in which only some of the affected rows are programmed by the pre-processed data would also potentially offer the protections afforded by the presently illustrated embodiment. When pre-processed data for those affected rows is being streamed to input0 of mux 414, bypass logic 413 selects input0 of mux 414 and the pre-processed data is provided at mux 414's output as part of configuration bit stream 205. At other times, bypass logic 413 selects input1 of mux 414 so that output from redundancy processing circuitry 412 is provided as part of configuration bit stream 205. Configuration bit stream 205 is provided to data register 420 of lab 410. Data register 420 may include row-shifting circuitry and corresponding control logic to selectively implement row shifting of data in accordance with the PLD's redundancy scheme based upon information in fuse register 415. Ultimately, the configuration data in stream 405 is loaded into the configuration elements which may be visualized as a matrix spread throughout a LAB region. An exemplary redundancy scheme providing the context in which a "forced" bad row designation together can be utilized as a protective setting further described below (see FIGS. 6a-10 and accompanying text).

Continuing with the description of FIG. 4, in the present embodiment, certain data placed in programming data stream 200s is not used for determining configuration values but rather is used by bypass logic 413 to determine when to select input0 of mux 414 and when to select input1 of mux 414. In that manner, from the perspective of transmitting data through mux 414, the data that is pre-processed effectively bypasses redundancy processing circuitry 412.

Figure 5:
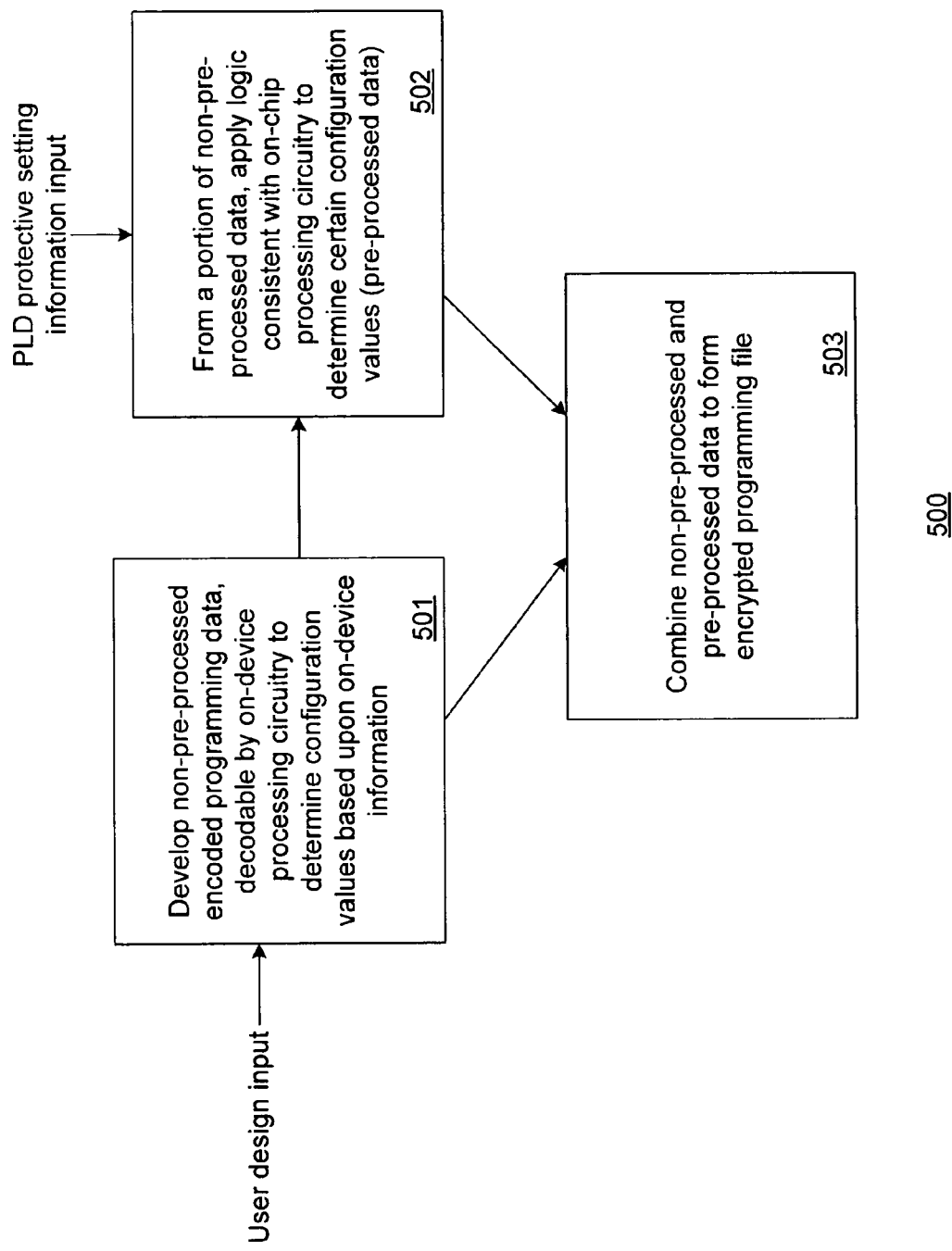
FIG. 5 illustrates exemplary process steps 500 performed by design program 455 (referenced in FIG. 4) to generate a file of encrypted programming data (such as, for example, data 200 referenced in FIGS. 2-4) for programming a PLD that has a certain applied protective setting; the process steps, applied setting, and PLD are consistent with aspects of a particular embodiment of the present invention.

FIG. 5 illustrates exemplary process steps 500 performed by design program 455 (referenced in FIG. 4) to generate a file of encrypted programming data (such as, for example, data 200 referenced in FIGS. 2-4) for programming a PLD that has a certain applied device setting; the process steps, applied setting, and PLD are consistent with aspects of a particular embodiment of the present invention. At block 501, non-pre-processed programming data is generated based upon user design inputs. In other words, a PLD user has specified a desired PLD design, and, based on those specifications, the design program generates encoded data, i.e., data that can be used, through further processing, to determine actual configuration bit values that will implement the user's design. At block 502, for a portion of non-pre-processed data, logic consistent with certain on-device processing circuitry (e.g. portions of redundancy processing circuitry 412 of FIG. 4) is applied to provide pre-processed data. The processing is applied in light of a protective device setting of the PLD. For example, information regarding a redundancy setting designating a particular non-defective row as "bad" may be provided to the design configuration program and used to pre-process data corresponding to particular rows or row portions affected by the applied redundancy setting.

In the present embodiment, the pre-processed data comprises the actual configuration bit values to be loaded into particular configuration elements. However, in alternative embodiments, pre-processed data may include data that must undergo some further processing on the PLD before configuration bit values are determined, but that does not need to undergo all of the processing on the PLD that will be applied to the non-pre-processed data. For example, in an alternative, pre-processed data might be combined with processed output of certain on-device processing circuitry and then both that processed output data and the pre-processed data undergo further on-device processing to determine actual configuration values for loading into configuration elements.

At block 503, the pre-processed data is combined with the remaining non-pre-processed data (i.e. the portion of the non-pre-processed data generated under the block 501 step that has not been pre-processed under the step of block 502). The combined data provides a file of encrypted programming data consistent with the principles of an embodiment of the present invention.

FIGS. 6a-10 illustrates aspects of an exemplary redundancy scheme and associated redundancy processing logic which may be utilized for aspects of implementing an embodiment of the present invention. Specifically, FIGS. 6a-8c illustrate vertical routing structures and connections for selected rows of exemplary PLDs in the context of an exemplary redundancy scheme while FIGS. 9-10 and accompanying text (including Table 1 below accompanying the FIG. 9 description and Table 2 below accompanying the FIG. 10 description) illustrate alternative processing logic and associated data encoding that might be utilized to implement the illustrated redundancy scheme. The illustrated redundancy scheme may be implemented via a configuration program that encodes data and on-device redundancy processing circuitry that decodes the data in light of particular redundancy settings of the device. Aspects of this redundancy scheme are further illustrated and described in co-pending U.S. application Ser. No. 10/856,434 ("Redundancy Structures and Methods in a Programmable Logic Device") (Note that U.S. application Ser. No. 10/856,434 discloses many aspects and nothing stated here or in that application should be interpreted as limiting the scope of the other.) The particular details of the illustrated redundancy scheme are not critical to the present invention. Rather, they simply provide one example of a relationship between on-device processing circuitry, off-device encoding, and applied device settings that can be utilized in conjunction with selected pre-processing of certain data in light of certain device settings to implement protections consistent with an embodiment of the present invention.

Figure 6C:
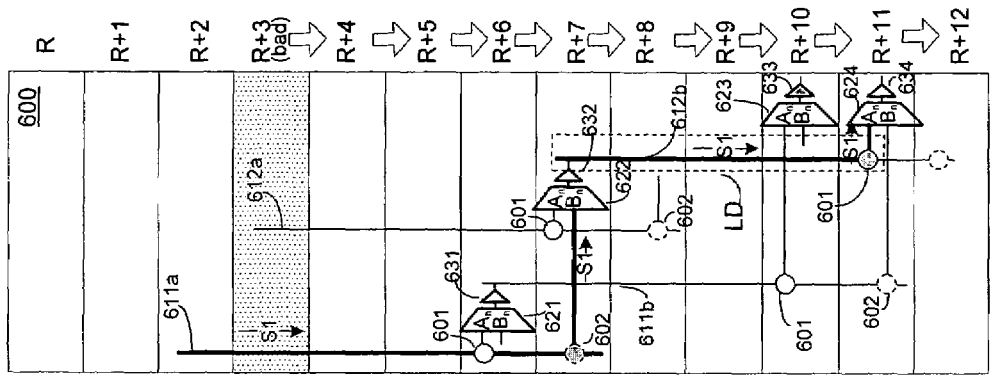
Figure 6B:
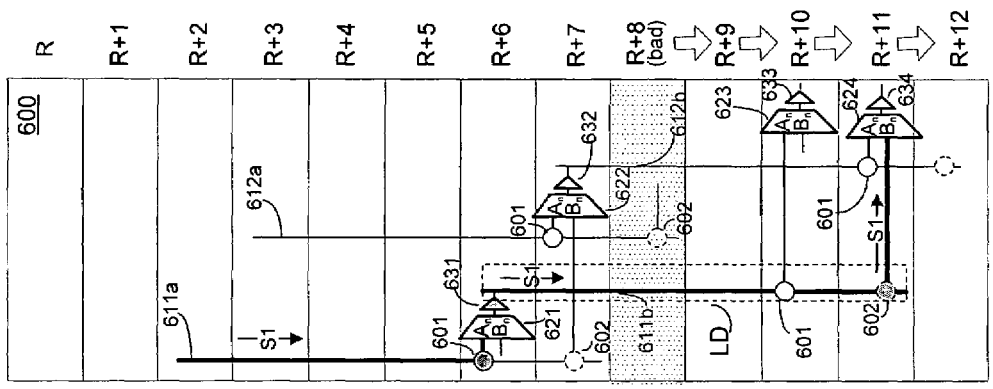
Figure 6A:
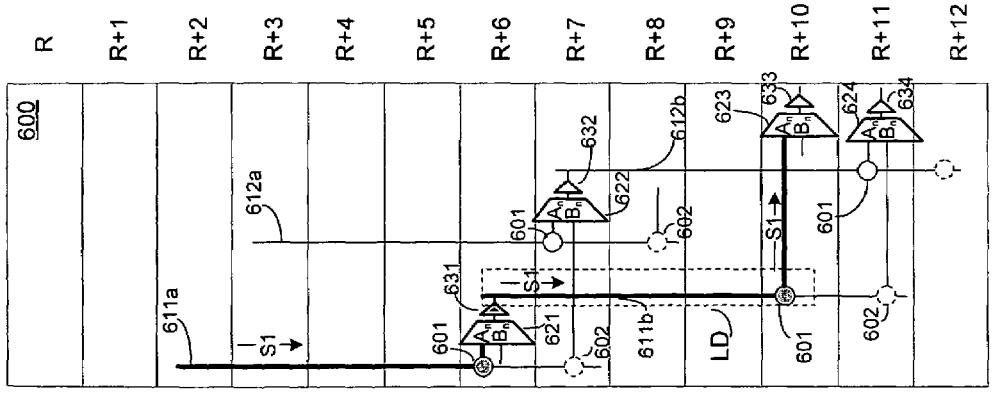

FIGS. 6a-6c illustrate routing from downstream vertical lines for selected rows in a portion 600 of a PLD operating in normal (FIG. 6a) and redundant (FIGS. 6b-6c) modes in accordance with the illustrated redundancy scheme. "Downstream" simply refers to the fact that connections from these lines are located downstream from the line driver where downstream is determined relative to a redundancy row-shifting direction (irrespective of whether the redundancy row shifting is presently engaged).

Referring to FIG. 6a, PLD portion 600 includes vertical lines 611a, 611b, 612a, and 612b; multiplexers ("muxes") 621, 622, 623, and 624; drivers 631, 632, 633, and 634; connections 601; and connections 602. The PLD portion 600 illustrated includes thirteen rows (labeled R to R+12) of a logic array of the PLD that includes portion 600. The term "array" in this context simply refers to the fact that at least some of the PLD circuitry may be viewed as associated with one of multiple rows.

In the presently illustrated example, connections 601 and 602 are not field programmable. As will be explained further below, programming of muxes to select particular inputs is used to implement a particular choice of routing paths. However, in alternative embodiments, connection vias that are similar to connections 601 and 602 but that are field programmable may be used. "Routing connections" as referred to herein may refer to any one of a number of types of elements—or element inputs—including connections such as connections 601 and 602, inputs to routing elements such as inputs to muxes 621-124, or inputs to other routing elements.

As illustrated in FIG. 6a, a logical line "LD" is, in a normal mode of PLD portion 600, implemented on first vertical line 611b to provide a signal pathway to driver 633 through the $A_n$ input of mux 623. The term "logical line" is used to refer to a particular set of connectivity characteristics that are available from the perspective of a PLD's user (one example of a PLD user might be a person or computer that is using the PLD to design or provide a signal processing system). A logical line provides connectivity of a certain logical length or lengths as measured in usable rows. For example, in FIG. 6a, logical line "LD" is implemented on vertical line 611b and provides connectivity from driver 631 in row R+6 to driver 633 in row R+10 via a connection 601 and the $A_n$ input of routing input mux 623. This connectivity may be referred to as having a logical length four, that is to say, four usable rows away from the row in which the line is driven. FIG. 6a further illustrates, by way of example, a signal S1 whose routing path includes logical line LD.

In particular embodiments, muxes such as muxes 623 and 124 may select inputs for a LAB, an LE, a horizontal routing line, another vertical routing line (V-line), an IO BUS line or other circuitry. For purposes herein, such muxes will occasionally be referred to as routing input muxes.

Referring to FIG. 6b, the same PLD portion 600 of FIG. 6a is illustrated, except that row R+8 in the FIG. 6b illustration is bad. Thus, the redundancy scheme is invoked to shift rows below row R+7 to repair the PLD in light of the defect to row R+8. The rows illustrated that are shifted may be referred to as operating in a redundant mode.

It will be understood by those skilled in the art that a row such as row R+8 in FIG. 6*b* may be considered to be "defective" due to a defect that is physically located in the same row or in another row. For example, a vertical line somewhere other than the illustrated portion 600 might be driven from row R+8 but have a short or open on that line in row R+11. This defect will cause row R+8 to be considered "bad" as the defective line is driven from that row (R+8) and a row-shifting redundancy scheme might be able to repair the PLD by treating row R+8 as bad and shifting rows accordingly. Thus, it will be understood that when a row is referred to herein as having a "defect," it will mean that the row is considered bad from the perspective of repairing the device, whether or not the physical location of the defect is in the row that is designated as bad.

Continuing with FIG. 6*b*, a spare row exists below row R+8, but is not separately shown. Routing connections are shifted down from row R+8 to the spare row to effect the repair. In this manner, within a repairable region defined above a spare row, a number of "redundant mode" rows (e.g. rows R+9, R+10, R11, etc.) are utilized in a redundant mode in the same manner as a number of corresponding "normal mode" rows (e.g. rows R+8, R+9, R+10, etc.) would have been used in a normal mode. Row shifting begins in rows spanned by first vertical line 611*b*, but below the row corresponding to that line's driver 631.

In this example, logical line LD is still implemented on first vertical line 611*b*, however its connectivity is implemented via a connection 602 to the $B_n$ input of mux 624 associated with row R+11. Although, in this FIG. 6*b* example, the physical length of the connection implemented on conductor 611*b* is extended by one row, the logical length remains constant at length four. Because row R+8 is bad, it is not counted in the logical length. To enhance illustration of the example, the path for routing signal S1 is again highlighted, here showing a redundant mode routing path.

Referring to FIG. 6*c*, the same PLD portion 600 of FIGS. 6*a*-6*b* is illustrated, except that row R+3 in the FIG. 6*c* illustration is bad. Thus, the redundancy scheme is invoked to shift rows below row R+2 to repair the PLD in light of the defect in row R+3. The row shifting begins in rows above the driver 631 of first vertical line 611*b* and continues in the other illustrated rows occupied by lines 611*b* and 612*b*.

In this example, row shifting includes the row from which first vertical line 611*a* is driven and logical line LD is shifted to second vertical line 612*b*. Here logical line LD provides connectivity from driver 632 in row R+7 to driver 634 in row R+11 via a connection 601 and the An input of routing input mux 624. The path of signal S1 in this example is highlighted. As shown, the selective wire shift is accomplished by enabling the $B_n$ input of mux 622 so that line 611*a* has connectivity to line 612*b* via a connection 602, mux 622, and driver 632. The logical length of line LD's connectivity is again four, with no unusable rows between line 612*b*'s drive point in row R+7 and routing connection in row R+11.

As used herein, terms such as "A" input and "B" input and similar such terms are merely labels used to distinguish one input from another. Similarly, terms such as "first" vertical line, "second" vertical line, "first" row, and "second" row are simply labels used merely to distinguish one vertical line (or row) from another.

FIGS. 7*a*-7*c* illustrate routing from downstream vertical lines for selected rows in a portion 700 of a PLD operating in normal (FIG. 7*a*) and redundant (FIGS. 7*b*-7*c*) modes in accordance with the illustrated redundancy scheme. The lines shown in FIGS. 7*a*-7*c* cross a spare row, row R+5.

Referring to FIG. 7*a*, PLD portion 700 includes vertical lines 711, 712, and 713; drivers 731, 732, and 733; connections 701; and connections 702. In order to avoid over complicating the drawings, routing input muxes are not separately shown. However, it is understood that a connection 701 is a connection to the $A_n$ input of a routing input mux associated with the row corresponding to the particular 701 connection and a connection 702 is a connection to the $B_n$ input of a routing input mux associated with the row corresponding to the particular 702 connection. The PLD portion 700 illustrated includes thirteen rows (labeled R to R+12) of a logic array of the PLD that includes portion 700.

As illustrated in FIG. 7*a*, two logical lines LD1 and LD2 are, in a normal mode of PLD portion 700, implemented on respective first vertical lines 711 and 712. Line 711 is driven from row R+3 and, as illustrated, the activated connections to routing input muxes are in row R+4 (via a connection 701 to the $A_n$ input of a row R+4 routing input mux) and row R+8 (via a connection 702 to the $B_n$ input of a row R+8 routing input mux). In the normal mode illustrated in FIG. 7*a*, spare row R+5 is not used (as no repair is needed) and thus is not counted in measuring logical length. Thus the logical connectivity lengths provided on line LD1 relative to the driver row (R+3) are one and four. In other words, logical line LD1 provides connections that are one and four useable rows from the driver row. Line LD2 has similar connectivity characteristics but in different rows as implemented on vertical line 712. Line 712 is driven from row R+4 and, as illustrated, the activated connections to routing input muxes are in row R+6 (via a connection 702 to the $B_n$ input of a row R+6 routing input mux) and row R+9 (via a connection 702 to the $B_n$ input of a row R+9 routing input mux). Thus the connectivity lengths provided on line LD2 are also one and four (with row R+5 not being used and thus not being counted). Signal paths are highlighted to show connectivity provided by LD1 and LD2 in a normal mode for exemplary signals S1 and S2.

Referring to FIG. 7*b*, the same PLD portion 700 of FIG. 7*a* is illustrated, except that rows R+4 and R+9 in the FIG. 7*b* illustration are bad. A first repairable region is defined above spare row R+5. Another spare row exists but is not separately shown below spare row R+5. Thus a second repairable region is defined below spare row R+5 and above the un-shown spare row. Thus, the redundancy scheme is invoked to shift row R+4 and the rows below row R+8 to repair the PLD in light of the defects to rows R+4 and row R+9.

Logical line LD1 is implemented on the same vertical line 711. However, because row R+4 is now considered bad and row R+5 is now activated, the line 711 connection in row R+4 shifts to row R+5 via a connection 702 to the $B_n$ input of a row R+5 mux (row R+5 active in redundant mode). Line LD1 thus still has connectivity of one and four logical lengths (measured in useable rows) away from the row R+3 driver.

Logical line LD2 shifts to vertical line 713 driven by driver 733 in row R+5. Vertical line 713 provides connectivity to row R+6 via a connection 701 to the $A_n$ input of a row R+6 mux and to row R+10 via a connection 702 to the $B_n$ input of a row R+10 mux. Because bad row R+9 is not used, the connectivity lengths relative to the line LD2's driver are still one and four.

Signal paths are highlighted to show connectivity provided by LD1 and LD2 in the FIG. 7*b* redundant mode for exemplary signals S1 and S2.

Referring to FIG. 7*c*, the same PLD portion 700 of FIGS. 7*a*-7*b* is illustrated, except that rows R+1 and R+9 in the FIG. 7c illustration are bad. Thus, the redundancy scheme is invoked to shift rows R+1, R+2, R+3, and R+4 and also to shift the rows below row R+8 to repair the PLD in light of the defects in rows R+1 and row R+9.

Logical lines LD1 and LD2 shift to respective second vertical lines 712 and 713. Logical line LD1 as implemented on second vertical line 712 provides connectivity to spare row R+5 (active in redundant mode) via a connection 701 to the $A_n$ input of a row R+5 mux and to row R+8 via another connection 701 to the $A_n$ input of a row R+8 mux. Line LD1 thus still has connectivity of one and four logical lengths away from the line's drive point which, in this redundant mode, is in row R+4.

Logical line LD2 as implemented on second vertical line 713 provides connectivity to row R+6 via a connection 701 to the $A_n$ input of a row R+6 mux and to row R+10 via a connection 702 to the $B_n$ input of a row R+10 mux. Because bad row R+9 is not used, the connectivity lengths relative to the row from which the line is driven (row R+5 in this redundant mode) are still one and four.

Signal paths are highlighted to show connectivity provided by LD1 and LD2 in the FIG. 7c redundant mode for exemplary signals S1 and S2.

Figures 8A, 8B, 8C:
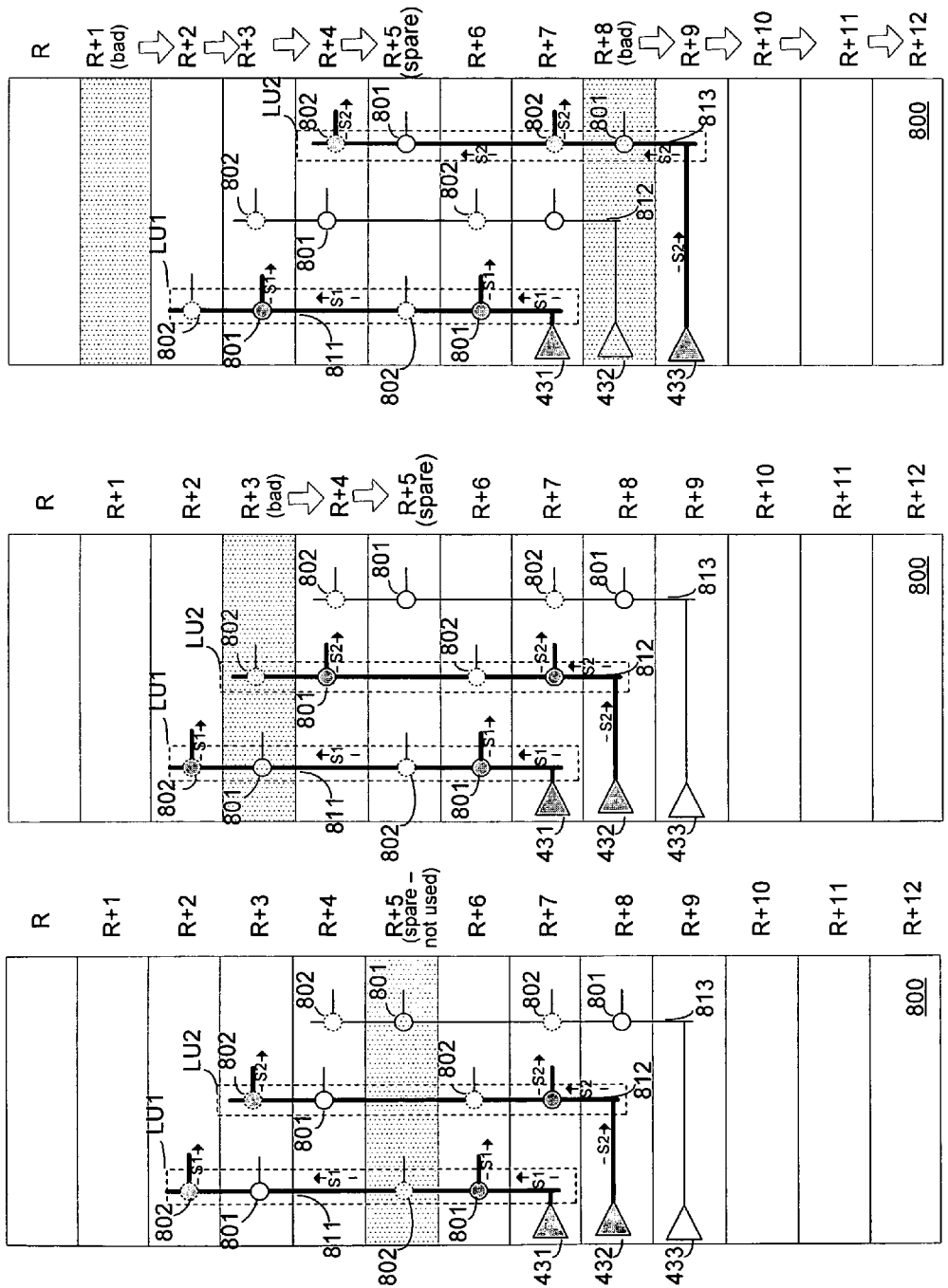

FIGS. 8a-8c illustrate routing from upstream vertical lines for selected rows in a portion 800 of a PLD operating in normal (FIG. 8a) and redundant (FIGS. 8b-8c) modes in accordance with the illustrated redundancy scheme. The lines shown in FIGS. 8a-8c cross a spare row, row R+5.

Referring to FIG. 8a, PLD portion 800 includes vertical lines 811, 812, and 813; drivers 831, 832, and 833; connections 801; and connections 802. In order to avoid over complicating the drawings, routing input muxes are not separately shown. However, it is understood that a connection 801 is a connection to the $A_n$ input of a routing input mux associated with the row corresponding to the particular 801 connection and a connection 802 is a connection to the $B_n$ input of a routing input mux associated with the row corresponding to the particular 802 connection. The PLD portion 800 illustrated includes thirteen rows (labeled R to R+12) of a logic array of the PLD that includes portion 800.

As illustrated in FIG. 8a, two logical lines LU1 and LU2 are, in a normal mode of PLD portion 800, implemented on respective first vertical lines 811 and 812. Line 811 is driven from row R+7 and, as illustrated, the activated connections to routing input muxes are in row R+6 (via a connection 801 to the $A_n$ input of a row R+6 routing input mux) and row R+2 (via a connection 802 to the $B_n$ input of a row R+2 routing input mux). In the normal mode illustrated in FIG. 8a, spare row R+5 is not used (as no repair to other rows is needed) and thus is not counted in measuring logical length. Thus the logical connectivity lengths provided on line LU1 relative to the driver row (R+7) are one and four. Line LU2 has similar connectivity characteristics but in different rows. Line LU2 is, in normal mode, implemented on vertical line 812. Line 812 is driven from row R+8 and, as illustrated, the activated connections to routing input muxes are in rows R+7 (via a connection 801 to the $A_n$ input of a row R+7 routing input mux) and R+3 (via a connection 802 to the $B_n$ input of a row R+3 routing input mux). Thus the connectivity lengths provided on line LU2 are also one and four (with row R+5 not being used and thus not being counted). Signal paths are highlighted to show connectivity provided by LU1 and LU2 in a normal mode for exemplary signals S1 and S2.

Referring to FIG. 8b, the same PLD portion 800 of FIG. 8a is illustrated, except that row R+3 in the FIG. 8b illustration is bad. A repairable region is defined above spare row R+5. Thus, the redundancy scheme is invoked to shift rows R+3 and R+4 to repair the PLD in light of the defect in rows R+3.

Logical line LU1 is implemented on the same vertical line 811. Conductor 811's connection patterns also remain the same and connectivity is provided to routing input muxes in row R+6 (via a connection 801 to the $A_n$ input of a row R+6 routing input mux) and row R+2 (via a connection 802 to the $B_n$ input of a row R+2 routing input mux). Spare row R+5 is now utilized and thus counted in measuring logical length; however, row R+3 is now bad and is not counted in measuring logical length. Thus, line LU1 still has connectivity of one and four logical lengths (measured in useable rows) away from the row R+7 driver.

Logical line LU2 is still implemented on the same vertical line 812. However, the line 812 connection in bad row R+3 shifts to row R+4 via a connection 301 to the $A_n$ input of a row R+4 routing input mux. As spare row R+5 is now activated and counted in measuring logical length, line LU2 still provides connectivity of one and four logical lengths away from the row R+8 driver.

Signal paths are highlighted to show connectivity provided by LU1 and LU2 in the FIG. 8b redundant mode for exemplary signals S1 and S2.

Referring to FIG. 8c, the same PLD portion 800 of FIGS. 8a-8b is illustrated, except that rows R+1 and R+8 in the FIG. 8c illustration are bad. A first repairable region is defined above spare row R+5. Another spare row exists but is not separately shown below spare row R+5. Thus, a second repairable region is defined below spare row R+5. As illustrated, the redundancy scheme is invoked to shift rows R+1, R+2, R+3, and R+4 and also rows below row R+7 to repair the PLD in light of the defects in rows R+1 and R+8.

Logical line LU1 is still implemented on the same vertical line 811. However, the line 811 connection in row R+2 shifts to row R+3 via a connection 301 to the $A_n$ input of a row R+3 routing input mux. As spare row R+5 is now activated and counted in measuring logical length, line LU1 still provides connectivity of one and four logical lengths away from the row R+7 driver.

Logical line LU2 shifts to vertical line 813. Line LU2, as implemented on second vertical line 813, provides connectivity to row R+7 via a connection 802 to the $B_n$ input of a row R+7 mux and to row R+4 via a connection 802 to the $B_n$ input of a row R+4 mux. Row R+5 is now utilized and counted in measuring logical length while bad row R+8 is not. Thus, the connectivity lengths relative to the row from which the logical line is driven (row R+9 in this redundant mode) are still one and four.

Signal paths are highlighted to show connectivity provided by LU1 and LU2 in the FIG. 8c redundant mode for exemplary signals S1 and S2.

Referring to FIGS. 6a-8c, those skilled in the art will appreciate that the various routing paths illustrated from vertical lines to routing input muxes may be selected based on the programming of those routing input muxes to select particular inputs. For example, referring to FIGS. 6a and 6c, the FIG. 6a path for signal S1 (including logical line LD) is implemented by programming mux 621 to select its $A_n$ input and programming mux 623 to select its $A_n$ input while the FIG. 6c path for signal S1 (also including logical line LD) is implemented by programming mux 622 to select its $B_n$ input and programming mux 624 to select its $A_n$ input. As a further example, referring to FIGS. 7a and 7c, the FIG. 7a path for signal S2 (including logical line LD2) is implemented by programming a row R+6 routing input mux coupled to line 712 via a connection 702 to select its $B_n$ input and a row R+9 routing input mux coupled to line 712 via a connection 702 to select its $B_n$ input (routing input muxes not separately shown), and the FIG. 7c path for signal S2 (also including logical line LD2) is implemented by programming a row R+6 routing input mux coupled to line 713 via a connection 701 to select its $A_n$ input and programming a row R+10 routing input mux coupled to line 713 via a connection 702 to select its $B_n$ input (routing input muxes not separately shown).

For ease of illustration and description, only two inputs $A_n$ and $B_n$ have been shown for each routing input mux. However, in an actual implementation, these two inputs may be two of several inputs of a larger mux. The $A_n$ and $B_n$ inputs are illustrated and referenced herein because they represent connections from vertical lines associated with the redundancy scheme as illustrated in FIGS. 6a-8c.

FIG. 9 is a flow diagram illustrating a process 900 for implementing a bit flipping decision with respect to pairs of configuration bits AB. The process determines first whether the pair relates to a connections from vertical lines associated with the relevant redundancy scheme. If the pair does relate to such connections, the process then determines whether the pair should be "flipped" relative to a default value of 10. This bit flip decision can determine the selection between an "$A_n$" mux input and a "$B_n$" mux input such as the mux inputs referenced in the context of FIGS. 6a-8c (pictured explicitly only in FIGS. 6a-6c).

From the perspective of a particular routing element, the selection of $A_n$ or $B_n$ mux inputs results in selection of a first or second vertical line from which to receive signals. For example, referring to FIG. 6b, mux 624 may select between line 611b and 612b for routing signals to driver 634. As will be described further below, this selection may be based on a condition related to redundancy, such as, for example, whether or not a designated bad row (e.g. a defective redundant mode row, or a unused spare row in normal mode) is between a driver row and connection row. In other examples, other conditions related to redundancy (including conditions that may exist in a normal mode or a redundant mode and are related to one or more redundancy schemes for which the device has been designed) may also trigger such a selection.

In one aspect, such redundancy-related selections may result in the locating of a particular logical line on a particular physical line. Such a logical line may then become one of many logical lines which may be chosen for routing particular signals in the context of designs ultimately implemented by a user. However, the illustrated exemplary processes below, including those of FIG. 9 and FIG. 10, do not necessarily need to take into account the location of a particular logical line. These processes just rely on the information relating to the relationship between designated bad rows, routing element rows, V-line driver rows, and whether a connection is upstream or downstream. Alternative processes might rely on a different perspective. An alternative process might, for example, take into account whether a particular logical line (that ultimately will be made available to a user) is implemented on a first vertical line or a second vertical line. From this perspective, the decision to locate a given logical line on a first or second vertical line might, for example, depend on whether the first vertical line's driver is in a shifted row.

Returning to the exemplary process of FIG. 9, process 900 assumes that, as a default, a pair of bits "AB" for mux inputs coupled to V-lines associated with the redundancy scheme illustrated in FIGS. 6a-8c is set to "10." Such a setting effects selection of the $A_n$ mux input (in the illustrated examples of FIGS. 6a-8c, the $A_n$ input is coupled to one V4 line and the $B_n$ mux input is coupled to another V4 line). Process 900 further assumes that some configuration bit pairs will not relate to selection of inputs coupled to V-lines associated with the redundancy scheme illustrated in FIGS. 6a-8c. Given these assumptions, process 900 determines whether a particular bit pair is associated with mux inputs coupled to vertical lines associated with the specified redundancy scheme (e.g. the V4 lines in FIGS. 6a-8c) and, if so, whether those bits should be set at "10" to select the $A_n$ input or should be "flipped" and set at "01" to select the $B_n$ input.

At block 901, process 900 determines whether the particular bit pair AB enables a connection from V-lines associated with the specified scheme. If this determination is "No," then, as indicated by block 902, process 900 does not manipulate the bit pair and the bit pair retains whatever values have already been specified. If this determination is "Yes," block 903 determines whether the connections from the V-lines being configured are upstream or downstream from the line driver (i.e. upstream or downstream relative to redundancy row shifting direction).

If the relevant V-line connections are upstream from the line drivers, block 905 determines whether there is a BAD row in the $L_{up}$ rows below row R[n]. "$L_{up}$" is the upstream logical length of the V-line. In this case, that length is four. Row R[n] refers to the row (after row shifting, if any, has taken place) associated with the routing input mux being programmed by the bit pair AB. A "BAD" row simply means that in the given mode (normal or redundant) the row is not being used. In a normal mode of the PLD, a row that has been designated to be a spare row would not be used. Also, a row that is forced to be designated as "bad" for purposes of the applying a protective device setting in the context of a particular embodiment of process 100 of FIG. 1 may not necessarily be defective, but would nonetheless be bypassed based on a device setting that designates that row as "bad." Thus, from the perspective of process 900, both a spare rows in a normal mode and a "forced" designated bad row triggering a redundant mode are considered "bad" even though such rows may not be defective. "Bad" in this context is just a designation for identifying a row or row portion that is not used in a particular mode, normal or redundant. If the result of block 905 is "No" then, as indicated by block 911, the bits are set at AB=10 to select the $A_n$ input. Note, it is assumed that this is the default bit setting absent application of process 900. If the result of block 905 is "Yes," then block 907 defines "D" such that row R[n+D] is the bad row and $1 \leq D \leq L_{up}$. Block 909 determines (or identifies) the logical distance between the connection and the driver of the V-line coupled to the $A_n$ input of the relevant routing input mux and subtracts "D" from the value of that distance. If the result of block 909 is $\geq 0$, i.e. if there is a BAD row between the relevant V-line driver and the connection, then, as indicated by block 910, the bit pair is manipulated to set AB=01, which selects the $B_n$ input of the routing input mux. If the result of block 909 is <0, i.e. if there is not a BAD row between the row R[n] connection and the V-line coupled to the $A_n$ input of the relevant routing input mux, then, as indicated by block 911, the bit pair is set to AB=10 to select the $A_n$ input.

If the relevant V-line connections are downstream from the line drivers, block 906 determines whether there is a BAD row in the $L_{dwn}$ rows above row R[n]. "$L_{dwn}$" is the downstream logical length of the V-line. (Note, although not shown in FIGS. 6a-8c, it is possible for the same V-line to have both an upstream and downstream logical length if, for example, it is driven from a midpoint rather than an endpoint). If the result of block 906 is "No" then, as indicated by block 911, the bits are set at AB=10 to select the $A_n$ input. If the result of block 906 is "Yes," then block 908 defines "D" such that row R[n–D] is the bad row and $1 \leq D \leq L_{dwn}$. Using the "D" defined in block 908, process 900 proceeds from block 909 as previously described.

One skilled in the art will further appreciate that process 900 represents logic that can readily be implemented in software, hardware, or a combination of hardware and software.

For illustrative purposes, with reference to FIG. 4, configuration program 455 and redundancy processing circuitry 412 in PLD 410 implement process 900 of FIG. 9 (circuitry 412 also utilizes data from fuse register 415 as part of implementing process logic 900). In particular, configuration program 455 encodes AB bit pairs with information indicating whether the bit pairs are for programming connections from V-lines associated with the specified redundancy scheme (e.g. the V4 lines illustrated in FIGS. 6a-8c) and, if so, whether those connections are upstream or downstream from the relevant line drivers. Furthermore, configuration program 455 also encodes AB bit pairs with information indicating the distance between a relevant V-line driver and a row of the V-line connection configured by the AB bit pair. Thus, configuration program 455 adds information to the non-pre-processed portion of programming data 200 sufficient for performing the process 900 steps illustrated by blocks 901 and 903 of FIG. 9 and also adds information used in performing the step illustrated in block 909. In the context of V4 lines, if a uniform 4-bit encoding scheme is employed, four data bits within programming data 200 used to convey this information about a bit pair is summarized in the following Table I:

TABLE I

| Bit3 (indicates whether redundancy protected) | Bit2 | Bit1 | Bit0 |
|---|---|---|---|
| 0 | 0 (padding) | Data 1 | Data 0 |
| 1 | Up/Down | Distance 1 | Distance 0 |

Referring to the second row of the above Table I, if Bit3 is "0", then relevant connections are not from a V4 line associated with the present redundancy scheme. This result implicates block 902 of process 900, thus the programming bits will be set as determined by program 455. Therefore, the values for the A and B configuration bits themselves are included as "Data 1" and "Data 0" in a particular four-bit stream as Bit1 and Bit0. In this case, Bit2 is simply a padding bit for consistency and is set to 0. When CB 411 and redundancy processing logic 412 receive this bit sequence, it is recognized that, because Bit3 is "0", Data 1 and Data 0 provide the configuration values to be included in configuration bit stream 205 loaded into data register 420.

Referring to the third row of Table I, if Bit3 is "1," then the illustrated redundancy scheme is invoked. In this case, more information is needed before the correct values of the "AB" pair can be determined. Thus, in this case, program 455 encodes information to be used by processing circuitry 412 in determining the values for the AB pair. In particular, Bit2 is used to indicate whether the V4 line connection is upstream or downstream.

Bit1 and Bit0 are used to indicate the distance between the connection and the relevant V-line driver. Note that in the case of a V4 line, the maximum value for this distance is "four," thus, in the illustrated example, two bits are necessary and sufficient to represent this information. Those skilled in the art will understand that the presently illustrated encoding may be modified to include more bits if the redundancy scheme is applied to connections from longer V-lines. Also, the number of bits required to convey information for a given length line, or other information, may vary if different and/or non-standard types of binary encoding are used.

Returning to the illustrated example, in the case that Bit3 is "1", redundancy processing circuitry 412 of CB 411 uses the information provided with Bit2 (indicating whether lines are upstream or downstream) and Bit1 and Bit0 (indicating distance between connection and relevant driver), as well as information provided from Fuse Register 415 regarding which rows are designated "BAD" to carry out process 900 to determine what values to set for the AB bit pair; and then CB 411 provides those values in configuration bit stream 205 for loading into data register 420.

The way in which the redundancy scheme illustrated in FIGS. 6a-8c and the processing logic illustrated in FIG. 9 may be leveraged to implement an embodiment of the present invention, such as, for example, process 100 of FIG. 1 carried out in the context of the hardware and software illustrated in FIG. 4, may be summarized as follows: One or more rows or row portions in PLD 410 may be designated "bad" by programming the designation information into fuse register 415. This forced "bad" designation setting (one example of an applied setting that can be used as a "protective" setting in the context of process 100 of FIG. 1) may be applied to all PLDs 410 given to a particular customer. That customer would also receive program 455 to use in developing designs that would be implemented by generating programming data 200 to be sent as programming data stream 200s to PLD 410. Program 455 would have or would receive information about the applied setting. For a certain number of rows affected by the applied setting, program 455 would "pre-process" programming data consistent with the logic of redundancy processing circuitry 412 in light of the applied setting and this pre-processed portion would be included in data stream 200s. As described earlier, the pre-processed portion of data stream 200s would be provided via mux 414 as part of configuration bit stream 205. The non-pre-processed portion would be processed on-device by processing circuitry 412. Processing circuitry 412 processes the non-pre-processed portion by implementing the logic of process 900 based upon information included in programming data 200 and based upon information from fuse register 415.

Because program 455 pre-processes data for certain rows affected by the applied protective setting, it generates programming data that can only be used to configure a PLD having the correct protective setting. Thus, an unlicensed person who improperly generates or obtains programming data 200 for a particular design, cannot successfully implement the design on a PLD that does not have the correct applied setting. Therefore, the PLD provider can offer some protection to a particular licensed PLD customer by providing only that customer with PLD's having a certain applied setting and by providing only that customer with a configuration program that generates programming data in light of that applied setting.

Those skilled in the art will appreciated that many alternatives to the software/hardware division illustrated in FIG. 4 for implementing a process such as process 900 of FIG. 9. Also, the hardware for implementing a bit "flip" or bit "selection" might include hardware outside of a PLD's control block, such as, for example, hardware distributed in the data register or distributed locally to relevant configuration elements.

In the primary illustrated embodiment, on-chip logic circuitry such as redundancy processing circuitry 412 is implemented by dedicated circuitry. However, in alternatives, such on-chip processing circuitry may be implemented by a general purpose processor embedded on the chip that runs software for implementing a process or process portion in accordance with the principles illustrated herein. In one example, such software may be downloaded from a user computer such as user computer 450 as part of the execution of a configuration program such as program 455.

Figure 10:
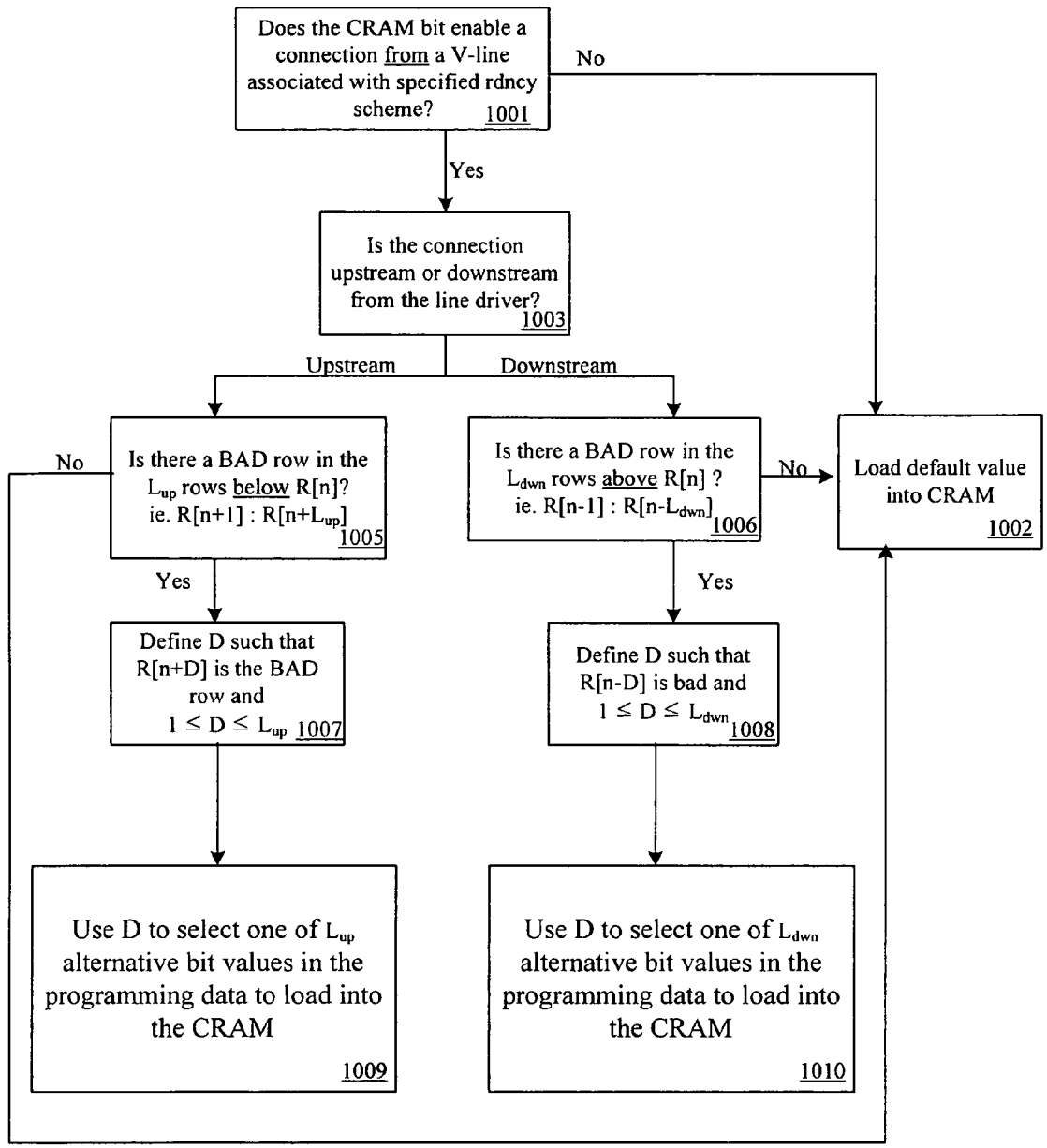
FIG. 10 is a flow diagram illustrating a process 1000 for implementing a bit setting decision with respect to a configuration bit for a routing connection. Process 1000 of FIG. 10 illustrates one of many possible alternatives to process 900 of FIG. 9.

FIG. 10 is a flow diagram illustrating a process 1000 for implementing a bit setting decision with respect to a configuration bit for a routing connection. The result of such a bit setting decision can control a mux input such as, for example, either an "$A_n$" or a "$B_n$" mux input referenced in the context of FIGS. 6a-8c. Process 1000 of FIG. 10 illustrates one of many possible alternatives to process 900 of FIG. 9 consistent with the scope of the present invention. Process 1000 treats bits individually rather than as pairs. Process 1000 may be applied whether or not the bits being set relate to consecutive configuration elements in a same frame of such elements.

Process 1000 assumes that the programming data for setting the bit specifies a default value, and then determines whether that default value should be modified.

At block 1001, process 1000 determines whether the particular bit to be set is for enabling a connection from a V-line associated with the specified scheme (e.g. the V4 lines illustrated in FIGS. 6a-8c in the context of applying this example to the scheme illustrated in those figures). If this block 1001 determination is "No," then, as indicated by block 1002, process 1000 sets the configuration bit (the bit to be loaded into the relevant CRAM) at the default value. If this block 1001 determination is "Yes," then block 1003 determines whether the connection being configured is upstream or downstream from the line driver (i.e. upstream or downstream relative to redundancy row shifting direction).

If the relevant V-line connection is upstream from the line driver, block 1005 determines whether there is a BAD row in the $L_{up}$ rows below row R[n], where $L_{up}$ is the upstream logical length of the V-line. Row R[n] refers to the row (after row shifting, if any, has taken place) associated with the routing input mux being programmed by the bit. If the result of block 1005 is "No" then, as indicated by block 1002, the bit is set to the default value. If the result of block 1005 is "Yes" then block 1007 defines "D" such that row R[n+D] is the bad row and $1 \leq D \leq L_{up}$. Block 1009 uses D to select from alternative bit values encoded in the programming data to set the bit. The encoding and selection of alternative bit values is further described below in the context of Table II.

If the relevant V-line connection is downstream from the line driver, block 1006 determines whether there is a BAD row in the $L_{dwn}$ rows above row R[n], where $L_{dwn}$ is the downstream logical length of the V-line. If the result of block 1006 is "No" then, as indicated by block 1002, the bit is set according to the default value specified in the programming data. If the result of block 1006 is "Yes," then block 1008 defines "D" such that row R[n−D] is the bad row and $1 \leq D \leq L_{dwn}$. Using the "D" defined in block 1008, process 1000 proceeds in block 1010 to select from alternative bit values encoded in the programming data to set the bit.

Process 1000 may be implemented using a combination of a user configuration program such as a modified version configuration program 455 in FIG. 4 and on-chip circuitry such as a modified version of redundancy processing circuitry 412 of FIG. 4. Such a configuration program would provide programming data for loading into the PLD. The pre-processed portion of the data would be pre-processed off-device consistent with the logic of process 1000 while the non-pre-processed portion would be processed on-device by processing circuitry 412 (modified consistent with this alternative).

In the context of non-pre-processed programming data provided by the configuration program for configuring a bit to program a connection from a V4 line (such as, for example, a bit to program an "$A_n$" or a "$B_n$" mux input of the muxes in FIGS. 6a-8c), the seven bits of programming data used in this example for encoding a single bit value to be loaded into a CRAM may be explained with reference to the following Table II:

TABLE II

| Bit6' (redundancy protected?) | Bit5' | Bit4' | Bit3' | Bit2' | Bit1' | Bit0' |
|---|---|---|---|---|---|---|
| 0 | 0 (padding) | Default value | 0 (padding) | 0 (padding) | 0 (padding) | 0 (padding) |
| 1 | Up/Down | Default value | Value if D = 1 | Value if D = 2 | Value if D = 3 | Value if D = 4 |

Table II represents data provided by a configuration program running on a user computer that the PLD can use to set a particular configuration bit for programming a particular CRAM consistent with process 1000 of FIG. 10. Referring to Table II, Bit6' indicates whether or not the connection being programmed is a connection from a V-line associated with the specified redundancy scheme. Determining the value of this bit relates to block 1001 of process 1000 and may be performed by the configuration program. Referring to the second row of Table II, if the connection does not relate to a V4 line connection associated with the specified redundancy scheme, then Bit6'=0. As indicated by block 1002, when the connection does not relate to a relevant redundancy connection, the default value is selected for setting the relevant CRAM bit. Setting the relevant CRAM bit to the default value may be performed on-chip by configuration logic based upon Bit6', which indicates that the default value is to be set, and Bit4', which indicates what that default value is. In this case, the remaining bits of Table II, including Bit5', Bit3', Bit2', Bit1', and Bit0', are all included as padding for consistency (i.e. so that the programming data for each bit to be set has a consistent length of 7 bits) and they are set to "0."

Referring to the third row of Table II, if Bit6' indicates that the connection relates to a V4 line connection associated with the specified redundancy scheme, i.e., in this example, Bit6'=1, then, as indicated by block 1003, process 1000 determines whether the connection is upstream or downstream from the line. Block 1003 of process 1000 may be performed by the configuration program and the result of block 1003 is represented by Bit5', which indicates whether the connection is upstream or downstream. In this case, Bit4' again indicates a default value. Determining the default value may be performed by the configuration program. Bit3', Bit2', Bit1', and Bit0', each indicate values which the CRAM bit should be set if a particular row, relative to the connection row, is bad. In this example, determining whether a particular row is bad is performed on-chip by configuration logic based on input from a fuse register. Such configuration logic uses bad row data to perform either steps 1005 and 1007 (if an upstream connection) or steps 1006 and 1008 (if a downstream connection), and then uses the results of those steps, i.e. D where D is the distance of the bad row from the connection row, to select the value of the CRAM bit from one of Bit3', Bit2', Bit1' or Bit0'. In this example, the value of these bits are determined by the configuration program and included with the programming data, while the selection of one of the values to set the CRAM bit, is done by the on-chip configuration logic.

Figure 11:
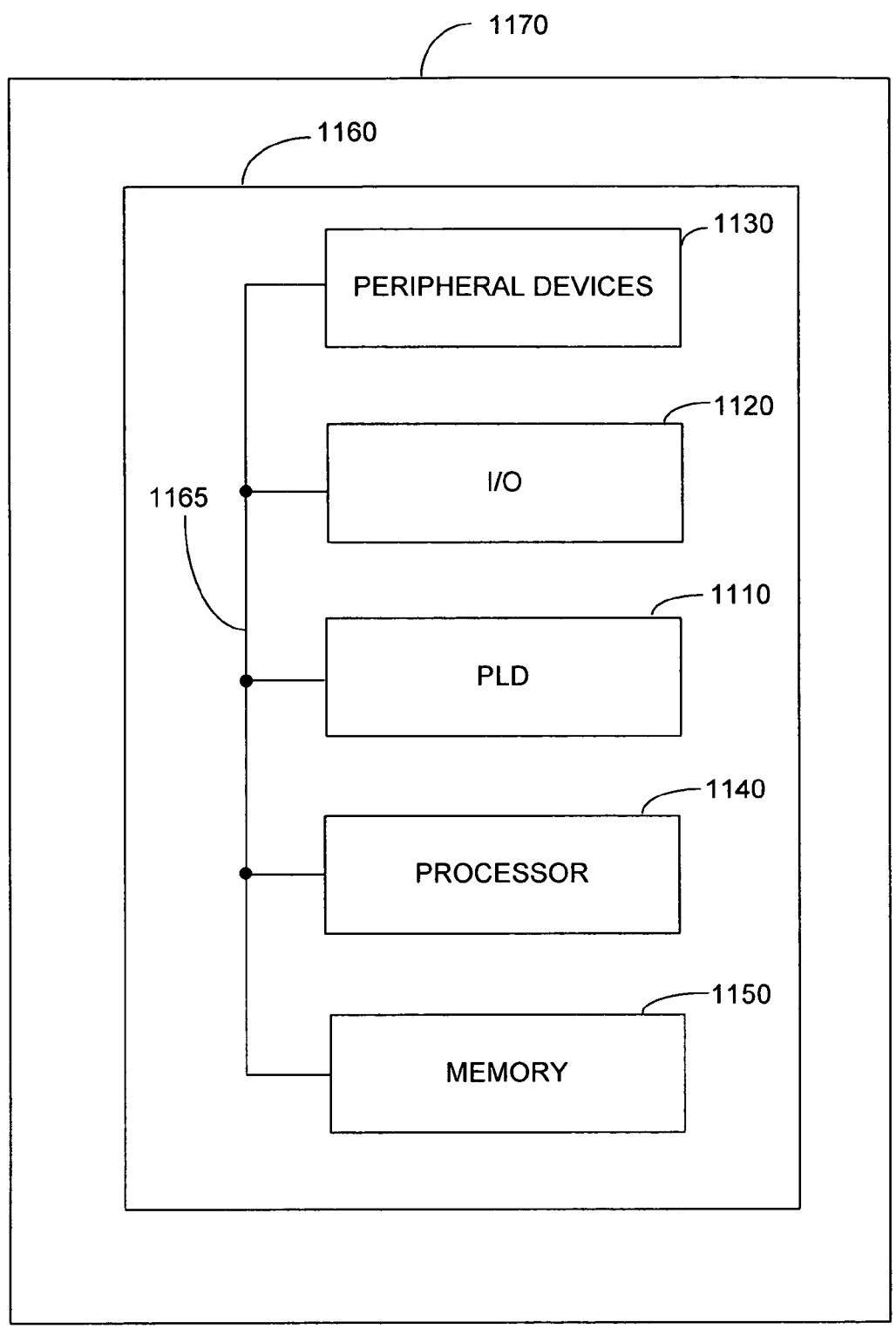
FIG. 11 illustrates a PLD 1110 in accordance with an embodiment of the present invention in a data processing system 1100.

FIG. 11 illustrates a PLD 1110 in accordance with an embodiment of the present invention in a data processing system 1100. Data processing system 1100 may include one or more of the following components: a processor 1140; memory 1150; I/O circuitry 1120; and peripheral devices 1130. These components are coupled together by a system bus 1165 and are populated on a circuit board 1160 which is contained in an end-user system 1170. A data processing system such as system 1100 may include a single end-user system such as end-user system 1170 or may include a plurality of systems working together as a data processing system.

System 1100 can be used in a wide variety of applications, such as computer networking, data networking, instrumentation, video processing, digital signal processing, or any other application where the advantage of using programmable or reprogrammable logic in system design is desirable. PLD 1110 can be used to perform a variety of different logic functions. For example, programmable logic device 1110 can be configured as a processor or controller that works in cooperation with processor 1140 (or, in alternative embodiments, a PLD might itself act as the sole system processor). PLD 1110 may also be used as an arbiter for arbitrating access to shared resources in system 1100. In yet another example, PLD 1110 can be configured as an interface between processor 1140 and one of the other components in system 1100. It should be noted that system 1100 is only exemplary.

Although certain aspects of the illustrated embodiments are described in the context of a programmable logic device having a row-based redundancy scheme (in which "vertical" lines are simply lines oriented to span multiple rows), the invention is equally applicable to programmable logic devices using column-based redundancy schemes (note that "horizontal" lines in a column-based scheme would cross multiple columns and thus would be equivalent to the vertical lines in a row based scheme). Because the terminology of rows and columns is relative to the orientation of the device, in a typical device having rows and columns perpendicular to each other, one may interchange the words row and column by merely rotating a device 90 degrees. For clarity, the present invention is described and claimed in terms of row-based arrangements, but the present description and claims apply equally to column-based redundancy arrangements.

Furthermore, although the term "row" is typically associated with a straight-line arrangement of items, alternative embodiments may employ row arrangements that are curved, or partially curved, or that have occasional jogs or gaps without necessarily departing from the spirit and scope of the present invention. Devices including such rows of varying orientation may still have a redundancy scheme that is within the scope of the present invention. Also, because a "vertical" line, as mentioned above, is defined herein as a line that spans multiple rows, a vertical line may similarly have different orientations along its length. It may also have just a portion that is vertical (i.e. spans multiple rows) while other portions are not vertical (i.e. not oriented to span multiple rows).

Although particular embodiments have been described in detail and certain variants have been noted, various other modifications to the embodiments described herein may be made without departing from the spirit and scope of the present invention, thus, the invention is limited only by the appended claims.

What is claimed is:

1. A method for protecting programming data generated for a programmable logic device (PLD), the method comprising:
applying a protective setting to the PLD, the protective setting affecting proper programming of the PLD;
generating programming data including pre-processed and non-pre-processed portions, the non-pre-processed portion including data to be processed by certain processing circuitry on the PLD ("on-device processing circuitry"), the pre-processed portion having been processed off-device consistent with processing logic of the certain on-device processing circuitry and in light of the protective setting;
providing the programming data to the PLD;
processing the non-pre-processed portion using the certain on-device processing circuitry; and
using the pre-processed portion together with output of the certain on device processing circuitry to program the PLD.

2. The method of claim 1 wherein the protective setting relates to a redundancy scheme of the PLD.

3. The method of claim 2 wherein applying the protective setting includes selection of a particular row to be a designated bad row.

4. The method of claim 1 wherein applying the protective setting includes fuse programming to indicate the protective setting.

5. The method of claim 4 wherein the fuse programming applying the protective setting indicates a designated bad row and invokes a redundancy scheme of the PLD.

6. The method of claim 1 wherein:
the programming data is generated by a configuration program given to a PLD user, the programming data being such that it will properly implement a design of the PLD user on a PLD having the protective setting, but will not readily implement the design on a PLD lacking the protective setting.

7. The method of claim 1 wherein the pre-processed data and the output of the certain on-device processing circuitry include configuration values for loading into configuration elements of the PLD.

8. The method of claim 1 wherein the pre-processed data and the output of the certain on-device processing circuitry are further processed by other on-device processing circuitry to determine configuration values for loading into configuration elements of the PLD.

9. A computer program product for generating programming data useable in programming a programmable logic device (PLD), the computer program product comprising executable code in an electronically readable medium for at least:
generating non-pre-processed programming data, the non-pre-processed data including data to be further processed by certain processing circuitry on the PLD ("on-device processing circuitry");

generating pre-processed programming data, the pre-processed data being processed consistent with logic of the certain on-device processing circuitry and in light of a protective setting of the PLD; and combining the non-pre-processed and pre-processed programming data to generate a programming data file useable in programming the PLD.

10. The computer program product of claim 9 wherein the protective setting relates at least in part to a redundancy scheme of the PLD.

11. The computer program product of claim 10 wherein the protective setting relates to selecting a row to be a designated bad row invoking the redundancy scheme.

12. The computer program product of claim 9 wherein the programming data will properly implement a design of the PLD user on a PLD having the protective setting, but will not readily implement the design on a PLD lacking the protective setting.

13. A programmable logic device (PLD) comprising:

processing circuitry on the PLD ("on-device processing circuitry") coupled to receive programming data including a non-pre-processed portion of the programming data, the processing circuitry including logic to process the non-pre-processed data; and bypass circuitry coupled to receive programming data including a pre-processed portion of the programming data, the pre-processed portion having been pre-processed consistent with processing logic of the processing circuitry and based at least in part upon a protective setting of the PLD, the bypass circuitry also being coupled to output the pre-processed portion together with data output from the processing circuitry; and an information register adapted to store information relevant to the protective setting.

14. The PLD of claim 13 wherein the protective setting relates to a redundancy scheme of the PLD.

15. The PLD of claim 14 wherein the protective setting includes selection of a particular row to be a designated bad row.

16. The PLD of claim 13 wherein the PLD information register is fuse programmable and the protective setting can be applied through fuse programming of the information register.

17. The PLD of claim 16 wherein fuse programming applying the protective setting indicates a designated bad row and invokes a redundancy scheme of the PLD.

18. The PLD of claim 13 wherein the bypass circuitry includes a multiplexer ("mux") coupled to receive the pre-processed data at one mux input and coupled to receive output of the processing circuitry at another mux input.

19. A data processing system comprising the PLD of claim 13.

20. A method for protecting programming data generated for a programmable logic device (PLD), the method comprising:

steps for applying a protective setting to the PLD;

steps for generating programming data including pre-processed and non-pre-processed portions;

steps for providing the generated programming data to the PLD; and steps for programming the PLD using the pre-processed portion of the programming data together with output of certain processing circuitry of the PLD ("on-device processing circuitry") that receives and processes the non-pre-processed portion of the programming data.

21. The method of claim 20 wherein the protective setting relates to a redundancy scheme of the PLD.

22. The method of claim 21 wherein applying the protective setting includes selection of a particular row to be a designated bad row.

23. The method of claim 20 wherein applying the protective setting includes fuse programming to indicate the protective setting.

24. The method of claim 23 wherein the fuse programming applying the protective setting indicates selection of a designated bad row and invokes at least a portion of a redundancy scheme of the PLD.

25. The method of claim 20 wherein:

the programming data is generated by a configuration program given to a PLD user, the configuration program being for generating the programming data such that the programming data will properly implement a design of the PLD user on a PLD having the protective setting, but will not readily implement the design on a PLD lacking the protective setting.

* * * * *